3,251,792
POLYOLEFINS STABILIZED WITH MIXTURES COMPRISING CITRIC ACID ESTERS AND SULFUR-CONTAINING COMPOUNDS
Otto A. Homberg, Woodlawn, Ohio, assignor to Carlisle Chemical Works, Inc., Reading, Ohio, a corporation of Ohio
No Drawing. Filed Sept. 5, 1961, Ser. No. 135,804
12 Claims. (Cl. 260—23)

This invention relates to the stabilization of solid polymers of monoolefins having 2 to 4 carbon atoms and especially to the stabilization of polypropylene.

It is an object of the present invention to develop a novel stabilizer for solid polymers of monoolefins having 2 to 4 carbon atoms, particularly polypropylene.

Another object is to prepare a stabilizer for such polymers employing only materials which have been approved by the United States Food and Drug Administration for food use.

A further object is to develop a stabilized polypropylene which can be employed as a food wrapping material.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

While the present invention is applicable to the stabilization of solid polyethylene, polypropylene, polybutylene and polyisobutylene, as well as copolymers of such materials, e.g., a 50:50 solid copolymer of ethylene and propylene, it is particularly suited to the stabilization of solid polypropylene or solid copolymers of propylene with ethylene. Polypropylene has a tertiary carbon atom which can be easily oxidized. This is missing from polyethylene. As a consequence, the problem of stabilizing polypropylene or copolymers of propylene with ethylene is different, and more difficult, from the stabilization of polyethylene.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl berylium with titanium tetrachloride. The polymers can be prepared using any of the Ziegler type of catalysts as set forth in Saly Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

To be completely effective, a stabilizer for a polymer of monoolefins has to overcome two forms of degradation. The first and most important is that encountered in the Accelerated Aging Test, wherein a sample is heated in a forced-draft oven at 133° C. Under these conditions the polymer discolors and becomes brittle, which indicates oxidating crosslinking. Unstabilized solid polypropylene normally cannot pass this test for as long as 24 hours.

The second form of degradation is that encountered sometimes in the fabrication of the polymer. Its effect is observed in the laboratory by determining the Melt Flow Drift. In this case, the change in melt index of the polymer with time, when heated at 300° C. is determined and expressed as a ratio of the initial melt index to the melt indices at fifteen and thirty minutes. The melt index is an inverse function of the viscosity and ideally should remain constant. It is found, however, to increase under the conditions of the test, indicating a decrease in viscosity and thereby a decrease in molecular weight of the polymer. Since the test is run in the presence of a limited supply of air, the degradation encountered here is largely thermal and is believed to be catalyzed by impurities, largely residual catalyst, in the polymer. For certain uses the melt flow drift effect is not important and in such cases the stabilizing agent which improves this property can be omitted.

It has now been found that citrates either alone or in combination with other materials act as stabilizers for polypropylene, polyethylene, ethylene-propylene copolymers, polybutylene and polyisobutylene. As will be observed hereinafter, in many cases the citrates exert a synergistic effect when employed together with other stabilizers, particularly dialkylthiodipropionates such as dilaurylthiodipropionate, hindered phenols, e.g., di-t-butyl-p-cresol and epoxidized compounds, e.g., epoxidized soya oil.

As the citrate, there can be employed neutral citrates having the formula

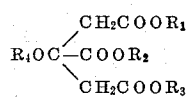

where $R_1$, $R_2$ and $R_3$ are selected from the group consisting of hydrocarbon, e.g., alkyl, aryl and cycloalkyl, and haloaryl and $R_4$ is selected from the group consisting of hydrogen, hydrocarbon, e.g., alkyl, aryl and cycloalkyl, or acyl groups. Preferably, the acyl group has 2 to 4 carbon atoms. Typical examples of such citrates are triethyl citrate, trimethyl citrate, tripropyl citrate, triisopropyl citrate, tributyl citrate, propyldibutyl citrate, tritertiary butyl citrate, triamyl citrate, trihexyl citrate, trioctyl citrate, tridecyl citrate, trioctadecyl citrate, tricyclohexyl citrate, triphenyl citrate, tribenzyl citrate, tri p-tolyl citrate, tri p-chlorophenyl citrate, acetyl trimethyl citrate, acetyl triethyl citrate, acetyl tripropyl citrate, acetyl tributyl citrate, acetyl propyldibutyl citrate, acetyl triamyl citrate, acetyl trioctyl citrate, acetyl trioctadecyl citrate, propionyl tributyl citrate, butyryl tributyl citrate, butyl tributyl citrate, phenyl tributyl citrate, chlorophenyl tributyl citrate, and acetyl triphenyl citrate.

The citrate is employed in an amount of 0.005 to 10%, preferably between 0.01 and 1%, by weight of the polymer.

The preferred citrates are acetyl tributyl citrate and tributyl citrate.

While the citrates can be used alone, as previously indicated, it is preferable to incorporate in the composition containing the monoolefin polymer and citrate at least one of the following components:

(a) A neutral sulfur compound having a thio linkage beta to a carbon atom attached to a carboxyl group and also having a hydrogen atom on said carbon atom in an amount of 0.005 to 5%;

(b) A phenol antioxidant, preferably a hindered phenol, in an amount of 0.005 to 5%;

(c) An epoxy compound in an amount of 0.005 to 5%; and (d) An alkaline earth metal salt of a higher fatty acid in an amount of 0.005 to 5%.

The percentages set forth in (a), (b), (c) and (d) above are based on the weight of the polymer. Preferably, the stabilizer composition, i.e., the citrate alone or admixed with one or more of components (a), (b), (c) and (d), is used in an amount of 0.1 to 5% by weight of the polymer.

The preferred neutral sulfur compound for use as component (a) is dilauryl-3,3'-thiodipropionate, although there can be employed other materials such as distearyl-3,3'-thiodipropionate (dioctyadecylthiodipropionate), dicyclohexyl-3,3'-thiodipropionate, dicetyl-3,3'-thiodipropionate, dihexyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercapto propionic acid, myristyl ester of 3-hydroxymethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiasebacate, dilauryl-4,7,8,11-tetrathiatetradecandioate, dimyristyl-4,11-dithiatetradecandioate, lauryl-3-benzothiazylmercaptopropionate, as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids include stearyl (1,2-dicarboethoxyethylthio) acetate, stearyl (1,2-dicarbolauryloxyethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilaurylmaleate, phenylthiodioctyl maleate, cetyl (1,2-dicarboethoxyethylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The preferred phenol is 2,6-di-t-butyl-p-cresol but there can be employed other phenols such as butylated hydroxyanisole, propyl gallate, 4,4'-thiobis (6-tertiary-butyl-m-cresol), 4,4'-cyclohexylidene diphenol, 2,5-di-tertiary-amyl hydroquinone, 4,4'-butylidene bis (6-tertiarybutyl-m-cresol), hydroquinone monobenzyl ether, 2,2'-methylene-bis (4-methyl-6-t-butylphenol), as well as the other phenols set forth in Salyer Patent 2,985,617. Other suitable phenols include 2-tertiary-butyl-4-decyloxyphenol, 2-tertiary-butyl-4-dodecyloxyphenol, 2-tertiary-butyl-4-octadecyloxyphenol, 4,4'-methylene-bis-(2,6-di tertiary butyl phenol), p-aminophenol, N-lauroxyl-p-aminophenol, 4,4'-thiobis (3-methyl-6-t-butylphenol), bis (o-(1,1,3,3-tetramethylbutyl) phenol) sulfide, 4-acetyl-β-resorcylic acid, A stage p-tertiary butylphenol-formaldehyde resin, 4-dodecyloxy-2-hydroxybenzophenone, 3-hydroxy-4-(phenylcarbonyl) phenyl palmitate, n-dodecyl ester of 3-hydroxy-4-(phenylcarbonyl) phenoxyacetic acid and t-butylphenol.

The preferred epoxy compound is epoxidized soya bean oil but there can be employed other epoxy compounds including epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins, phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis (9,10-epoxystearate).

As the alkaline earth metal salt of a fatty acid the preferred compound is calcium stearate. However, there can also be used calcium 2-ethylhexoate, strontium stearate, calcium palmitate, calcium ricinoleate, calcium oleate, barium octate, barium stearate and magnesium stearate, calcium linoleate.

Zinc stearate, cadmium stearate, cadmium octoate and other polyvinyl metal salts of fatty acids can also be used in some instances to replace all or part of the alkaline earth metal salt of the fatty acid.

While the present compositions can be utilized to form stabilized polypropylene, polyethylene or the like for use wherever such compositions are employed, a preferred form of the invention is directed to stabilizing solid polymers of monoolefins having 2 to 4 carbon atoms, and particularly polypropylene, which can be used for food purposes, e.g., as a food wrapping film. A preferred composition of this type which has been found unusually effective for incorporation into polypropylene and which contains only materials which have been approved by the United States Food and Drug Administration is as follows:

|  | Preferred (Formulation A) parts | Range, parts |
| --- | --- | --- |
| Dilauryl thiodipropionate | 3 | 1–3 |
| Di-t-butyl p-cresol | 1 | 0.5–1 |
| Epoxidized soya oil | 1 | 1–2 |
| Acetyl tributyl citrate | 1 | 0.5–1 |
| Calcium stearate | 1 | 0–1 |

When distearyl thiodipropionate is substituted for dilauryl thiodipropionate, the stabilization is not nearly as pronounced, particularly in the Melt Flow Drift Test. Butylated-hydroxyanisole, when substituted for the di-t-butyl-p-cresol, also was effective. Propyl gallate was effective as the phenolic antioxidant but has the disadvantage of blackening on oxidation and badly discoloring the polymer.

Tributyl citrate can be substituted for the acetyl tributyl citrate without deleterious effect.

Calcium stearate has an adverse effect in the Aging Test but is necessary to obtain the best results in the Melt Flow Drift.

Unless otherwise indicated, all parts and percentages are by weight.

The polypropylene employed in Examples 1–8 was an unstabilized polypropylene which had a melt index of 0.8 and which in the Aging Test at 133° C. was stable for 48 hours. The polypropylene employed in Example 9 was a commercially available polypropylene having a melt index of 0.8. The polypropylene of Example 9 is of food grade and has stabilizers incorporated therein. Example 9 is a comparison example.

polymer noted. The proportions or percentages are based on the polypropylene as 100.

| Example | I, percent | II, percent | III, percent | IV, percent | V, percent | VI, percent | VII, percent | Aging test, hours (133° C.) | Melt flow drift (300° C.) | | |
|---|---|---|---|---|---|---|---|---|---|---|---|
| | | | | | | | | | Initial | 15 min. | 30 min. |
| 1 | 0.3 | | 0.1 | | 0.1 | | | 168 | | | |
| 2 | 0.3 | | | 0.1 | 0.1 | | | 192 | | | |
| 3 | 0.3 | | | 0.1 | 0.1 | 0.1 | | 480 | | | |
| 4 | 0.3 | | 0.1 | | 0.1 | 0.1 | | 528 | 1 | 2 | 18 |
| 5 | | 0.4 | 0.1 | | 0.1 | 0.1 | | 528 | 1 | 5 | 30 |
| 6 | 0.3 | | 0.1 | | 0.1 | 0.1 | 0.1 | 264 | 1 | 2 | 10 |
| 7 | 0.15 | | 0.05 | | 0.05 | 0.05 | | 192 | 1 | 3 | 31 |
| 8 | 0.15 | | 0.05 | | 0.05 | 0.05 | 0.05 | 144 | 1 | 2 | 6 |
| 9 [1] | | | | | | | | 96 | 1 | 2 | 11 |

[1] A commercial stabilized polypropylene.

In Examples 1–8 the percentages are based on the weight of the polypropylene.

As previously set forth, in the Melt Flow Drift Test, the change in melt index at 15 and 30 minutes is expressed as a ratio of the initial melt index.

In Examples 1–8 the materials employed are identified as follows:

I. Dilauryl thiodipropionate
II. Distearyl thiodipropionate
III. Di-t-butyl-p-cresol
IV. Propyl gallate
V. Epoxidized soya oil
VI. Acetyl tributyl citrate
VII. Calcium stearate The stabilizer composition employed in Example 6, it will be observed, is the same as Formulation A described previously.

Improved stability of polyethylene, e.g., Alathon 14 (molecular weight about 20,000, density about 0.915), is observed when it is substituted for the polypropylene in Example 6.

Using Formulation A with various commercially available polypropylenes, none of which was stable in the Aging Test for over 48 hours, excellent stabilization was noted. Fresh epoxidized soya oil was employed in Formulation A but it was otherwise unchanged from that of Example 6.

In the following examples the materials are coded as follows:

DLTP is dilauryl thiodipropionate
6-But is 2,6-di-t-butyl p-cresol
TBC is tributyl citrate
ESO is epoxidized soya oil
Gal is propyl gallate
Acet is acetyl tributyl citrate
BHA is butylated hydroxyanisole
STC is stearyl citrate
ETC is ethyl citrate

*Example 11*

| DLTP | 6-But | TBC | Time (hours) |
|---|---|---|---|
| 0.3 | 0.1 | | 96 |
| 0.3 | | 0.1 | 96 |
| 0.3 | 0.1 | 0.1 | 168 |

*Example 12*

| DLTP | 6-But | ESO | TBC | Time (hours) |
|---|---|---|---|---|
| 0.3 | 0.1 | 0.1 | | 144 |
| 0.3 | 0.1 | | 0.1 | 168 |
| 0.3 | 0.1 | 0.1 | 0.1 | 480 |

*Example 10*

| Polypropylene | Percent Forlulation A | Aging test (133° C.) hours | Melt flow drift | | Temp., ° C. |
|---|---|---|---|---|---|
| | | | 15 min. | 30 min. | |
| Commercial Variety 1 | 0.25 | 576 | | | |
| Do | 0.70 | 744 | 2 | 8 | 300 |
| Do | 1.50 | 1,344 | | | |
| Commercial Variety 2 | 0.35 | 312 | 1 | 1 | 235 |
| Do | 0.7 | 432 | 1 | 1 | 235 |
| Commercial Variety 3 | 0.35 | 192 | 1 | 3 | 235 |
| Do | 0.7 | 264 | 2 | 6 | 235 |
| Commercial Variety 4 | 0.7 | 624 | 2 | 7 | 300 |
| Commercial Variety 5 | 0.7 | 264 | 2 | 12 | 300 |
| Commercial Variety 6 | 0.7 | 264 | 2 | 20 | 300 |

In the following examples samples of polypropylene having a melt index of 0.8 and a stability at 133° C. of not over 48 hours were blended in methylene chloride with the indicated substances. After separation of the solvent, the polypropylene was dried in a vacuum oven at 60° C. for four hours and then pressed into 20 ml. test panel. Samples of the panels measuring 3 inches by ½ inch were suspended in a forced draft oven at 133° C. and the time required to bring about degradation of the

*Example 13*

| DLTP | Gal | ESO | TBC | Acet | Time (hours) |
|---|---|---|---|---|---|
| 0.3 | 0.1 | 0.1 | | | 192 |
| 0.3 | 0.1 | 0.1 | 0.1 | | 384 |
| 0.3 | 0.1 | 0.1 | | | 192 |
| 0.3 | 0.1 | 0.1 | | 0.1 | 384 |

Example 14

| DLTP | 6-But | BHA | Gal | ESO | TBC | Acet | Time (hours) |
|------|-------|------|------|-----|-----|------|--------------|
| 0.3  |       |      |      | 0.1 |     |      | 96           |
| 0.3  | 0.1   |      |      | 0.1 |     |      | 168          |
| 0.3  |       |      | 0.1  | 0.1 |     |      | 192          |
| 0.3  | 0.05  |      | 0.05 | 0.1 | 0.1 |      | 360          |
| 0.3  | 0.05  |      | 0.05 | 0.1 |     | 0.1  | 360          |
| 0.3  |       | 0.1  |      | 0.1 |     |      | 168          |
| 0.3  |       | 0.05 | 0.05 | 0.1 |     |      | 168          |
| 0.3  |       | 0.05 | 0.05 | 0.1 | 0.1 |      | 336          |
| 0.3  |       | 0.05 | 0.05 | 0.1 |     | 0.1  | 432          |

Example 15

| DLTP | 6-But | ESO | STC | Time (hours) |
|------|-------|-----|-----|--------------|
| 0.3  | 0.1   |     |     | 96           |
| 0.3  |       |     | 0.1 | 1 >600       |
| 0.3  | 0.1   |     | 0.1 | 1 >600       |
| 0.3  | 0.1   | 0.1 |     | 168          |
| 0.3  |       | 0.1 | 0.1 | 1 >600       |
| 0.3  | 0.1   | 0.1 | 0.1 | 1 >600       |

Example 16

| DLTP | 6-But | ESO | ETC | Time (hours) |
|------|-------|-----|-----|--------------|
| 0.3  | 0.1   |     |     | 96           |
| 0.3  |       |     | 0.1 | 1 >600       |
| 0.3  | 0.1   |     | 0.1 | 1 >600       |
| 0.3  | 0.1   | 0.1 |     | 168          |
| 0.3  |       | 0.1 | 0.1 | 1 >600       |
| 0.3  | 0.1   | 0.1 | 0.1 | 1 >600       |

1 Sample still O.K. at this time.

Example 17

| Stabilizer: | Time (hours) |
|---|---|
| None | <24 |
| Acetyltributylcitrate | 48 |
| Tributylcitrate | 48 |
| Triethylcitrate | 48 |
| Tristearylcitrate | 48 |

The stabilizer compositions can be packaged and sold as such and can be blended into the polymer of the monoolefin by the processor or user of the polymer. Alternatively, the polymer manufacturer can blend the stabilizer into the polymer and sell the stabilized polymer to the processor or ultimate user.

What is claimed is:

1. A stable composition comprising a solid polymer of monomers consisting of at least one monoolefin having 2 to 4 carbon atoms and selected from the group consisting of ethylene, propylene, butylene and isobutylene containing as a stabilized therefor an effective amount of a mixture of (1) 0.005 to 5% of a dialkyl thiodipropionate wherein each alkyl group has 10 to 18 carbon atoms and (2) 0.005 to 1% of a trialkyl citrate wherein any substitutent replacing the alcoholic hydrogen is a hydrocarbon acyl group having 2 to 4 carbon atoms, said mixture being present in an amout to be effective as a stabilizer for said polymer.

2. Solid polypropylene containing a mixture of 0.005 to 5% of dilauryl thiodipropionate, 0.005 to 5% of a 1,2-epoxy compound and 0.005 to 1% of a trialkyl citrate wherein any substitutent replacing the alcoholic hydrogen is a hydrocarbon acyl group having 2 to 4 carbon atoms.

3. A solid stable composition comprising a polymer of a monomer selected from the group consisting of ethylene, propylene, butylene, isobutylene and mixtures thereof and containing as a stabilizer therefor (1) 0.005 to 1% of a citrate having the formula

where $R_1$, $R_2$ and $R_3$ are selected from the group consisting of hydrocarbon and haloaryl and $R_4$ is selected from the group consisting of hydrogen, hydrocarbon, haloaryl and acyl, (2) 0.005 to 5% of a neutral sulfur compound having a thio linkage beta to a carbon atom attached to a carboxyl group, said neutral sulfur compound being selected from the group consisting of dialkyl thiodipropionates, dicyclohexyl thiodipropionate, dibenzyl thiodipropionate, diphenyl thiodipropionate, dimethoxyphenyl thiodipropionate, alkyl esters of alkyl mercapto propionic acid, phenyl esters of alkyl mercapto propionic acid, alkyl esters of phenyl mercapto propionic acid, alkyl esters of benzyl mercapto propionic acid, alkyl esters of methoxyphenyl mercapto propionic acid, alkyl esters of cyclohexyl mercapto propionic acid, alkyl esters of hydroxymethyl mercapto propionic acid, alkyl esters of hydroxyethyl mercapto propionic acid, alkyl esters of methoxymethyl mercapto propionic acid, alkyl esters of carboxymethyl mercapto propionic acid, alkyl esters of carboxypropyl mercapto propionic acid, alkyl esters of polythiadialkanoic acids, alkyl esters of (1,2-dicarboalkoxyethylthio) acetates, alkyl thiodialkyl maleates, phenyl thiodialkyl maleates, benzyl thiodialkyl maleates, alkyl (1,2-dicarboethoxyethylthio) propionates, and the addition products of alkyl mercaptans with dialkyl itaconates, citraconates, fumarates and trialkyl aconitates, and (3) 0.005 to 5% of a 1,2-epoxy compound.

4. A composition according to claim 3 wherein the epoxy compound is epoxidized vegetable oil.

5. A composition according to claim 4 wherein the polymer is polypropylene.

6. A composition according to claim 3 wherein the polymer is polypropylene.

7. A composition according to claim 3 wherein there is also present 0.005 to 5% of a phenol antioxidant.

8. A composition according to claim 7 wherein the polymer is polypropylene.

9. A composition according to claim 1 including 0.005 to 5% of a phenol antioxidant.

10. A composition according to claim 9 including 0.005 to 5% of a 1,2-epoxy compound and 0.005 to 5% of an alkaline earth metal salt of a fatty acid.

11. Solid polypropylene containing as a stabilizer therefor (1) 0.005 to 5% of dilauryl thiodipropionate, (2) 0.005 to 1% of a trialkyl citrate wherein any substitutent replacing the alcoholic hydrogen is an acetyl group, (3) 0.005 to 5% of a nontoxic epoxidized fatty oil, (4) 0.005 to 5% of a nontoxic phenol antioxidant, and (5) 0.005 to 5% of a calcium salt of a higher fatty acid.

12. Solid polypropylene containing as a stabilizer therefor a mixture of (1) 3 parts dilauryl thiodipropionate, (2) 1 part of acetyl tributyl citrate, (3) 1 part of epoxidized soya oil, (4) 1 part of di-t-butyl-p-cresol, and (5) 1 part of calcium stearate, said stabilizer being present in an effective amount but not over 1% of said polypropylene, all of the components of the stabilizer except the thiodipropionate being present in an amount of at least 0.005% and the thiodipropionate being present in an amount of at least 0.015%.

References Cited by the Examiner

UNITED STATES PATENTS

| | | | |
|---|---|---|---|
| 2,429,165 | 10/1947 | Matheson et al. | 260—45.85 |
| 2,519,755 | 8/1950 | Gribbins | 260—45.85 |
| 2,680,106 | 6/1954 | Havens | 260—45.85 |
| 2,721,804 | 10/1955 | Rosenwald | 260—45.85 |
| 2,972,597 | 2/1961 | Newland et al. | 260—45.95 |
| 2,978,430 | 4/1961 | Thompson et al. | 260—45.95 |
| 2,985,536 | 5/1961 | Stein et al. | 260—45.85 |
| 2,985,617 | 5/1961 | Salyer et al. | 260—45.7 |
| 3,033,814 | 5/1962 | Tholstrup | 260—45.85 |

FOREIGN PATENTS 1,248,217  10/1960  France.

OTHER REFERENCES

Doolittle, "The Technology of Solvents and Plasticizers," pp. 988 to 989, John Wiley & Sons, Inc., New York, 1954.

LEON J. BERCOVITZ, *Primary Examiner.*

A. D. SULLIVAN, MILTON STERMAN, *Examiners.*

R. A. WHITE, T. D. KERWIN, *Assistant Examiners.*